United States Patent [19]

Peterson

[11] 4,305,592
[45] Dec. 15, 1981

[54] GAS SEAL BUSHING

[75] Inventor: Haakon O. Peterson, Yardley, Pa.

[73] Assignee: Transamerica Delaval, Inc., Trenton, N.J.

[21] Appl. No.: 87,537

[22] Filed: Oct. 23, 1979

[51] Int. Cl.³ .......................... F16J 15/34; F16J 15/40
[52] U.S. Cl. ......................................... 277/59; 277/65; 277/75; 277/93 R; 277/203; 308/187.1; 277/22
[58] Field of Search ................ 277/59, 65, 70, 71, 277/22, 72 R, 74, 75, 72 FM, 76, 93 R, 27, 935 D, 81 R, 96, 96.1, 203, 3, 167; 308/187.1, 187.2, 36.1

[56] References Cited

U.S. PATENT DOCUMENTS

| | | | |
|---|---|---|---|
| 2,956,825 | 10/1960 | Hore et al. | 277/71 X |
| 3,047,299 | 7/1962 | Karsten | 277/75 |
| 3,462,159 | 8/1969 | Baumann et al. | 277/27 |
| 3,467,396 | 9/1969 | Hershey | 277/74 |
| 3,575,424 | 4/1971 | Taschenberg | 277/71 X |
| 3,756,673 | 9/1973 | Strub | 277/75 X |
| 3,905,605 | 9/1975 | Hubner | 277/74 X |
| 3,937,477 | 2/1976 | Gyory | 277/65 X |
| 3,973,779 | 8/1976 | Burgmann et al. | 277/65 X |
| 4,010,960 | 3/1977 | Martin | 277/59 X |
| 4,183,540 | 1/1980 | Hytonen | 277/93 R X |

FOREIGN PATENT DOCUMENTS

| | | | |
|---|---|---|---|
| 231771 | 2/1964 | Austria | 277/74 |
| 531064 | 8/1954 | Belgium | 277/75 |
| 1476705 | 3/1967 | France | 277/93 R |
| 585898 | 2/1947 | United Kingdom | 277/152 |
| 857943 | 1/1961 | United Kingdom | 277/59 |

Primary Examiner—Robert S. Ward, Jr.
Attorney, Agent, or Firm—Hopgood, Calimafde, Kalil, Blaustein & Judlowe

[57] ABSTRACT

An improved pressure seal assembly for rotary machinery. The assembly utilizes a buffer oil flowing through a seal ring surrounding the rotating shaft of the machinery. The seal ring includes a plurality of openings about its periphery to pass the oil through the ring to a number of bearing pads. The oil serves to cool, lubricate, seal and damp the seal ring. The assembly reduces oil loss to the pressurized environment to a minimum.

6 Claims, 2 Drawing Figures

GAS SEAL BUSHING

BACKGROUND AND SUMMARY OF THE INVENTION

The present invention relates to pressure seal assemblies and, more specifically, pertains to low pressure differential seals between a gas and a buffer oil and the like for rotary machinery such as centrifugal compressors.

In most compressor applications it is undesirable and often unsafe to have any leakage of the compressed gas from the compressor to the surrounding environment. To prevent this from happening, a buffer oil at a higher pressure than the gas is introduced adjacent to the gas seal. A small portion of oil is allowed to leak across the gas seal to an annulus on the inside of the compressor adjacent to the seal. From this annulus the oil is collected in a cylinder and drained at regular intervals. The larger portion of the buffer oil, by far, crosses the air side seals dropping in pressure from a level which in some applications can be several thousand pounds per square inch to approximately atmospheric pressure.

The leakage of oil across the gas side seal should be as low as possible but still be sufficient to provide lubrication for the gas seal ring to prevent heat buildup and eventual seizure of the seal ring. Bushing seals of the type heretofore used have two significant disadvantages, firstly, the small clearances required for the seal rings makes the oil flow from the oil side to the gas side marginal, particularly at a low pressure differential. This is compounded when the seal ring rides eccentrically on the shaft. In the area of smallest clearance of an eccentrically riding ring, there may be virtually no oil film at all. Furthermore, changes in temperature between the seal ring and the shaft on a fast shutdown; for example, can cause the seal ring to cool faster than the shaft and thus contract to the point where seizure occurs. Secondly, when larger clearances are used in order to mitigate the aforementioned drawbacks there is an increase in the amount of oil leaking across the seal into the compressor collection cavity. Oil leakage is a cubic function of the clearance and a linear function of the axial length of the seal ring.

In accordance with the invention, a seal assembly for rotary machinery includes a seal ring in which the sealing oil first passes through the gas side seal which provides both cooling for the ring and lubrication for the bearing pads which are integral parts of the seal ring. The bearing pads center the seal ring so that it operates in the minimum leakage position for that clearance. The oil flow remains constant regardless of the pressure differential on the gas side seal ring since oil flow depends only on the pressure drop across the air side seals.

Accordingly, it is an object of this invention to provide an improved pressure seal assembly for rotating machinery.

It is another object of this invention to provide an improved pressure seal assembly utilizing a buffer oil.

It is another object of this invention to provide an improved pressure seal assembly capable of operating at high pressures and large peripheral shaft speeds.

It is another object of this invention to provide an improved pressure seal assembly having minimal oil leakage into the pressure side.

It is another object of this invention to provide an improved pressure seal assembly capable of operating at a small oil differential pressure.

Still other objects of this invention will become apparent upon a reading of the detailed specification to follow.

BRIEF DESCRIPTION OF THE DRAWINGS

In order to better understand the invention, reference is made to the following drawings taken in connection with the detailed specification to follow.

DESCRIPTION OF THE PREFERRED EMBODIMENT

Figure 1:
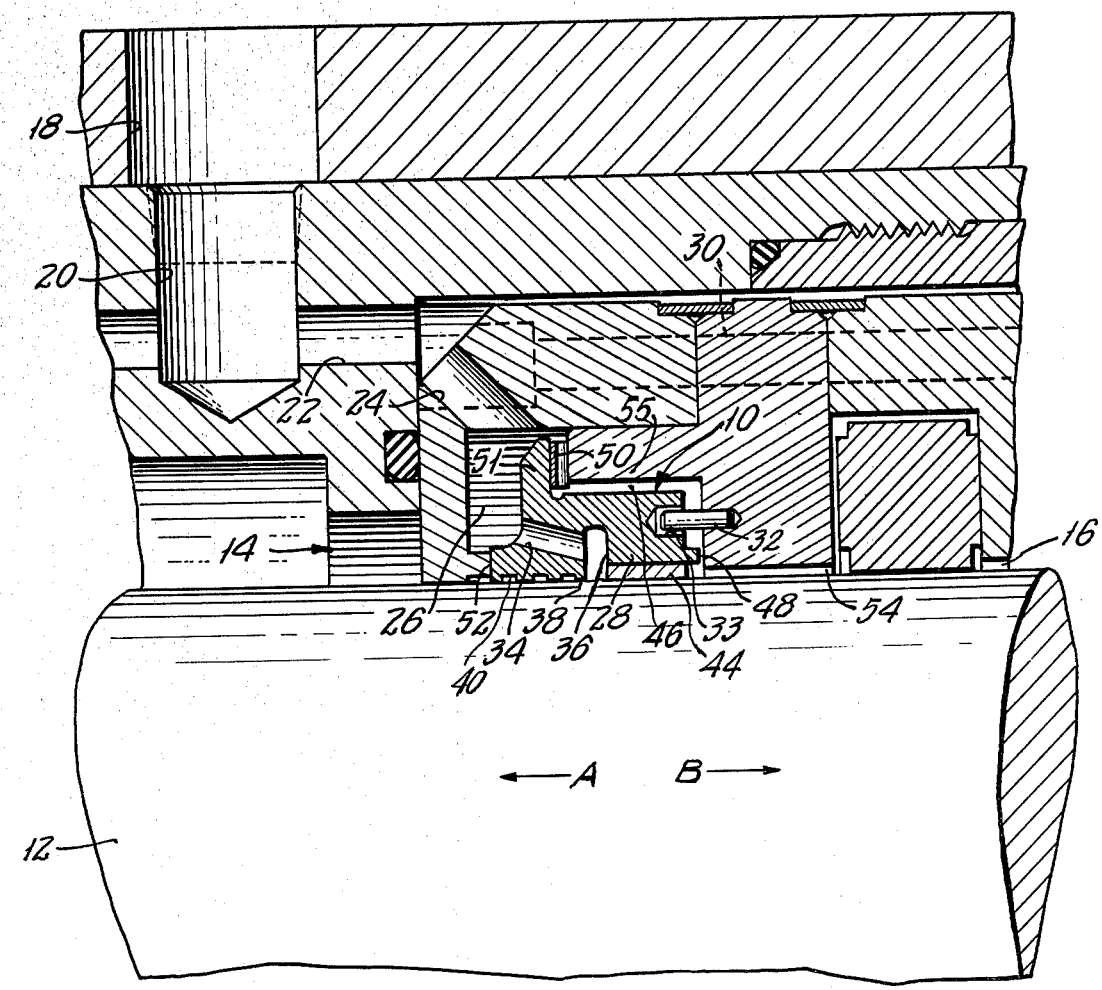
FIG. 1 is a sectional view of the improved pressure seal assembly constructed in accordance with a preferred embodiment of the instant invention.
Figure 2:
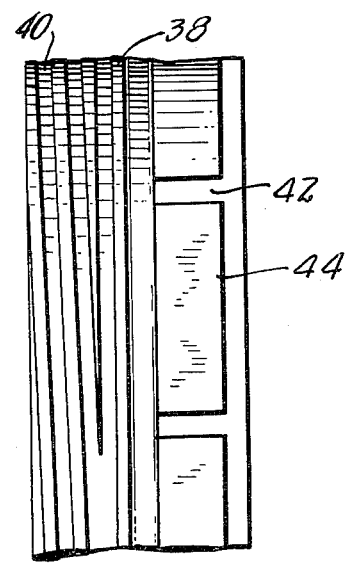
FIG. 2 is a partial view taken along line II in FIG. 1.

The drawings illustrate a pressure seal assembly 10 constructed in accordance with the present invention. Seal Assembly 10 is used to seal a rotating shaft 12 against passage of high pressure gas from the gas side 14 of rotary machinery, such as a centrifugal compressor, to the air (atmospheric) side 16. In operation, gas side 14 may contain pressures in the area of several thousand PSI. Oil maintained at a pressure differential of approximately 10 to 15 PSI above the pressure of gas side 14 enters an inlet 18 and is channeled through conduits 20, 22 and 24 to an annulus 26. The oil can be maintained at the differential pressure by means of an elevated tank or other equivalent means.

Disposed within annulus 26 is a seal ring 28 which is coupled to a stationary housing 30 by means of anti-rotation pins 32 which are loosely fitted to openings 33 in seal ring 28 to permit the axial positioning and centering of seal ring 28 to be carried out as hereinafter described. Seal ring 28 has a plurality of apertures 34 about its periphery which lead to annulus 36 surrounding shaft 12. The oil flows from annulus 26 through apertures 34 and thereafter into annulus 36, due to the fact that the oil is maintained at a pressure higher than both gas side 14 and air side 16 and thus, will tend to flow away from annulus 36 in both axial directions A and B.

The majority of the oil is, however, prevented from moving in direction A by means of a dam 38 on seal ring 28 whose clearance is such that only a small amount of the oil will pass therethrough. Seal ring 28 also includes a series of helical windback grooves 40 which tend to direct the oil that passes through dam 38 against it's natural flow in direction A and thus, prevent an excess of oil leakage to gas side 14 during operation. The oil moving in direction B towards air side 16 will pass through a series of axial grooves 42 spaced about the periphery of seal ring 28 and which provide a supply of oil for lubrication of a plurality of bearing pads 44 located between each axial groove 42. Bearing pads 44 serve to center ring 28 to provide the minimum clearance between it and shaft 12 and thus, the minimum oil loss through it.

An annular clearance 46 is provided between stationary housing 30 and the periphery of seal ring 28 to permit the oil to surround seal ring 28 and to provide hydraulic damping of induced vibrations in ring 28, due to the presence of the oil. A dam 48 is provided with a clearance of only a few thousandths of an inch between it and stationary member 30 so that the greater portion of the oil flow is through seal ring 28 to provide cooling and lubrication thereto. A wave spring 50 located between an extension 51 of seal ring 28 and an extension 55 of stationary housing 30 or other suitable biasing means is used to bias seal ring 28 against a sealing surface 52 on a projecting stationary member 53 to maintain seal ring 28 in its proper axial location. After the oil flows through seal ring 28, it will pass into an annular outer clearance 54 about shaft 12 and thereafter through the air side seals to be collected by known oil collecting mechanisms.

The instant invention is unique in that the oil flowing through seal system 10 provides four distinct functions: (1) the cooling of the seal ring; (2) the lubrication of the bearing pads; (3) the sealing of the gas atmosphere and (4) the damping of vibrations which occur in the seal ring.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A pressure seal assembly, utilizing an external supply of a fluid barrier such as oil at a pressure differential from that of the pressure to be sealed, for a rotating shaft comprising:

a one-piece stationary ring surrounding said shaft;

said ring including a portion proximate to the high-pressure side of said shaft having windback grooves on the surface adjacent to said shaft to direct said fluid barrier in a predetermined direction;

said ring including a portion with at least one bearing pad proximate to the low-pressure end of said shaft;

said ring having an annular space disposed between said windback grooves and said bearing pad; and a plurality of channels in said ring adjacent to said windback grooves communicating between said external supply of said fluid barrier and said annular space, said fluid barrier first flowing through said channels to cool said windback grooves, thereafter passing into said annular space to flow towards said windback grooves and said bearing pad, said windback grooves resisting the flow of said fluid barrier.

2. A seal assembly as claimed in claim 1, further including a stationary housing surrounding said ring and defining an annular opening around said ring, said fluid barrier being routed to said annular opening around said ring to thereby damp said ring against induced vibration.

3. A seal assembly as claimed in claim 2 wherein said annular opening around said ring includes dam means so that the fluid barrier flow around the outside of said ring is relatively small compared to the fluid barrier flow through said apertures and said bearing pads.

4. A seal assembly as claimed in claim 1, wherein said portion of said ring including said bearing pads includes a plurality of spaced apart axial grooves to define a plurality of bearing pads.

5. A seal assembly as claimed in claim 1, further including a stationary housing surrounding said ring, said housing including a projection abutting said ring to prevent axial motion of said ring along said shaft.

6. A seal assembly as claimed in claim 5, further including means for biasing said ring againt said projection.

* * * * *